US011251589B2

United States Patent
Tsurimoto et al.

(10) Patent No.: US 11,251,589 B2
(45) Date of Patent: Feb. 15, 2022

(54) GAS-INSULATED SWITCHING DEVICE

(71) Applicant: Mitsubishi Electric Corporation, Tokyo (JP)

(72) Inventors: Takao Tsurimoto, Tokyo (JP); Tadahiro Yoshida, Tokyo (JP); Junichi Abe, Tokyo (JP); Shintaro Yamada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/050,704

(22) PCT Filed: May 24, 2018

(86) PCT No.: PCT/JP2018/019997
§ 371 (c)(1),
(2) Date: Oct. 26, 2020

(87) PCT Pub. No.: WO2019/224975
PCT Pub. Date: Nov. 28, 2019

(65) Prior Publication Data
US 2021/0075201 A1 Mar. 11, 2021

(51) Int. Cl.
*H01H 33/662* (2006.01)
*H01H 33/666* (2006.01)
(Continued)

(52) U.S. Cl.
CPC ....... *H02B 13/0354* (2013.01); *H01H 33/666* (2013.01); *H01H 33/66207* (2013.01);
(Continued)

(58) Field of Classification Search
CPC .............. H02B 13/0354; H02B 13/045; H01H 33/66207; H01H 33/666; H01H 33/66238;
(Continued)

(56) References Cited

U.S. PATENT DOCUMENTS 5,191,180 A 3/1993 Kitamura et al.
6,865,072 B2* 3/2005 Sato ................... H01H 33/6661
361/619

(Continued)

FOREIGN PATENT DOCUMENTS

DE 4123710 A1 1/1992
EP 2434515 A1 3/2012
(Continued)

OTHER PUBLICATIONS

Extended European Search Report dated May 6, 2021, issued in corresponding European Application No. 18919670.2. (7 pages).
(Continued)

*Primary Examiner* — William A Bolton
(74) *Attorney, Agent, or Firm* — Buchanan Ingersoll & Rooney PC

(57) ABSTRACT

A gas-insulated switching device includes: a vacuum valve having a movable contact provided on one side of a movable conductor and a fixed contact provided to a fixed conductor; an insulation rod connected to another side of the movable conductor led out from the vacuum valve through a bellows; an operation rod connecting the insulation rod and an operation device; an airtight container in which the insulation rod, the other side of the movable conductor, and the operation rod are accommodated; and an intermediate pressure chamber formed by communication between internal spaces of the bellows and the airtight container. A sliding contact member is provided to the other side of the movable conductor. The sliding contact member is connected, via the airtight container, to a main circuit conductor. A communication portion provided between the airtight container and the sliding contact member allows communication inside the airtight container.

6 Claims, 9 Drawing Sheets

(51) Int. Cl.
*H02B 13/035* (2006.01)
*H02B 13/045* (2006.01)

(52) U.S. Cl.
CPC ... *H02B 13/045* (2013.01); *H01H 2033/6667* (2013.01); *H01H 2033/66223* (2013.01)

(58) Field of Classification Search
CPC . H01H 2033/66223; H01H 2033/6667; H01H 2033/66246
USPC ... 218/118, 3, 9, 10, 13, 119, 134, 135, 139, 218/140
See application file for complete search history.

(56) References Cited

U.S. PATENT DOCUMENTS

| | | | | |
|---|---|---|---|---|
| 8,110,770 | B2* | 2/2012 | Ichikawa | H01H 33/666 218/134 |
| 8,592,708 | B2* | 11/2013 | Hatanaka | H02B 13/0655 218/153 |
| 8,748,770 | B2* | 6/2014 | Nakayama | H02B 13/0354 218/7 |
| 2012/0061353 | A1 | 3/2012 | Hatanaka et al. | |
| 2012/0160810 | A1 | 6/2012 | Ohtsuka et al. | |
| 2014/0076851 | A1* | 3/2014 | Yano | H01H 33/38 218/120 |
| 2014/0124480 | A1 | 5/2014 | Yoshida | |
| 2015/0311684 | A1* | 10/2015 | Kagawa | H02B 5/06 361/618 |

FOREIGN PATENT DOCUMENTS

| | | |
|---|---|---|
| JP | S49009262 Y | 3/1974 |
| JP | S51005509 B | 2/1976 |
| JP | H06208820 A | 7/1994 |
| JP | 2006187195 A | 7/2006 |
| JP | 2011229195 A | 11/2011 |
| WO | 2012172703 A1 | 12/2012 |

OTHER PUBLICATIONS

International Search Report (with English Translation) and Written Opinion issued in corresponding International Patent Application No. PCT/JP2018/019997, 10 pages (dated Aug. 21, 2018).

* cited by examiner

GAS-INSULATED SWITCHING DEVICE

TECHNICAL FIELD

The present disclosure relates to a gas-insulated switching device provided mainly to a transmission and distribution grid for power.

BACKGROUND ART

A switching device which is provided to a transmission and distribution grid for power and opens/closes a circuit is, in the case of having a rated voltage of several kV or higher, placed inside a pressure tank in which insulation gas is sealed, so as to improve insulation performance for creepage, etc. Conventionally, $SF_6$ gas having excellent insulation performance has been mainly used as the insulation gas. However, $SF_6$ gas is a greenhouse gas that is very high in global warming potential. Therefore, discharge thereof to the atmosphere is restricted at present, and, as insulation gas that is low in global warming potential and substitutes for $SF_6$ gas, for example, gases such as dry air, $CO_2$, and $N_2$ are desired to be used. These insulation gases are inferior to $SF_6$ gas in insulation performance. Therefore, it is necessary to make adjustments such as causing the gas pressure in the pressure tank to be higher than in the case of $SF_6$ gas.

The switching device is provided with a bellows together with a movable conductor for opening/closing the circuit. In the case where the switching device is a vacuum circuit breaker, the inside of a container of the circuit breaker is kept vacuum. When a tank internal pressure is increased, the bellows is subjected to the differential pressure between the vacuum and the tank internal pressure. Therefore, a problem arises in terms of the strength of the bellows.

To address the above-described problem, for example, the following structure is known. The internal space of a bellows in a vacuum valve is set as a compartment having an intermediate pressure lower than a tank internal pressure and higher than a vacuum, whereby the differential pressure to be applied to the bellows is reduced, and thus the vacuum valve in which the strength of the bellows does not need to be increased is provided in a pressure tank (see, for example, Patent Document 1).

CITATION LIST

Patent Document

Patent Document 1: Japanese Laid-Open Patent Publication No. 2006-187195

SUMMARY OF THE INVENTION

Problems to be Solved by the Invention

In the above-described Patent Document 1, an insulation cylinder is provided as an airtight container accommodating therein a movable rod having an electrode and an insulation rod connected to the movable rod, the internal space of the bellows and the internal space of the insulation cylinder are in communication with each other, and the communication space is set as an airtight compartment having the intermediate pressure. Therefore, it is not necessary to increase the strength of the bellows. However, a flexible conductor connecting a cylindrical conductor to a current collector portion provided to the movable rod needs to be formed by superposing, a plurality of times, metal foil having a predetermined length on an assumption that the flexible conductor endures multiple times of opening/closing operations while allowing energization current to flow to the vacuum valve on a long-term basis. However, a problem arises in that the connection by the flexible conductor between the cylindrical conductor and the current collector portion cannot maintain electrical and mechanical reliability for a long period. In addition, the flexible conductor is, in terms of structure, a complicated movable portion having a stretchable part and is upsized. Therefore, a problem arises in that the airtight container cannot be downsized.

The present disclosure has been made to solve the above-described problems, and objects of the present disclosure are to: provide a gas-insulated switching device capable of ensuring long-term reliability by using a sliding contact member instead of a flexible conductor; and downsize an airtight container provided as a compartment having an intermediate pressure.

Solution to the Problems

A gas-insulated switching device according to the present disclosure is a gas-insulated switching device including, inside a pressure tank: a vacuum valve having, in a vacuum, a movable contact provided on one side of a movable conductor and a fixed contact provided to a fixed conductor; an insulation rod connected to another side of the movable conductor led out from the vacuum valve through a bellows; an operation rod connecting the insulation rod and an operation device for the vacuum valve to each other, the operation device being provided outside the pressure tank, the operation rod being connected via a tank bellows on the operation device side; an airtight container in which the insulation rod, the other side of the movable conductor, the operation rod, and the tank bellows are accommodated; and an intermediate pressure chamber formed by communication between an internal space of the bellows and an internal space of the airtight container. A sliding contact member is provided on the other side of the movable conductor. The sliding contact member is connected, via the airtight container, to a main circuit conductor provided inside the pressure tank. A communication portion which allows communication, across the sliding contact member, inside the airtight container is provided between the airtight container and the sliding contact member. The bellows and the tank bellows have a same outer diameter.

Effect of the Invention

In the gas-insulated switching device according to the present disclosure, long-term reliability is ensured, and the airtight container provided as a compartment having an intermediate pressure can be downsized.

DESCRIPTION OF EMBODIMENTS

Figure 1:
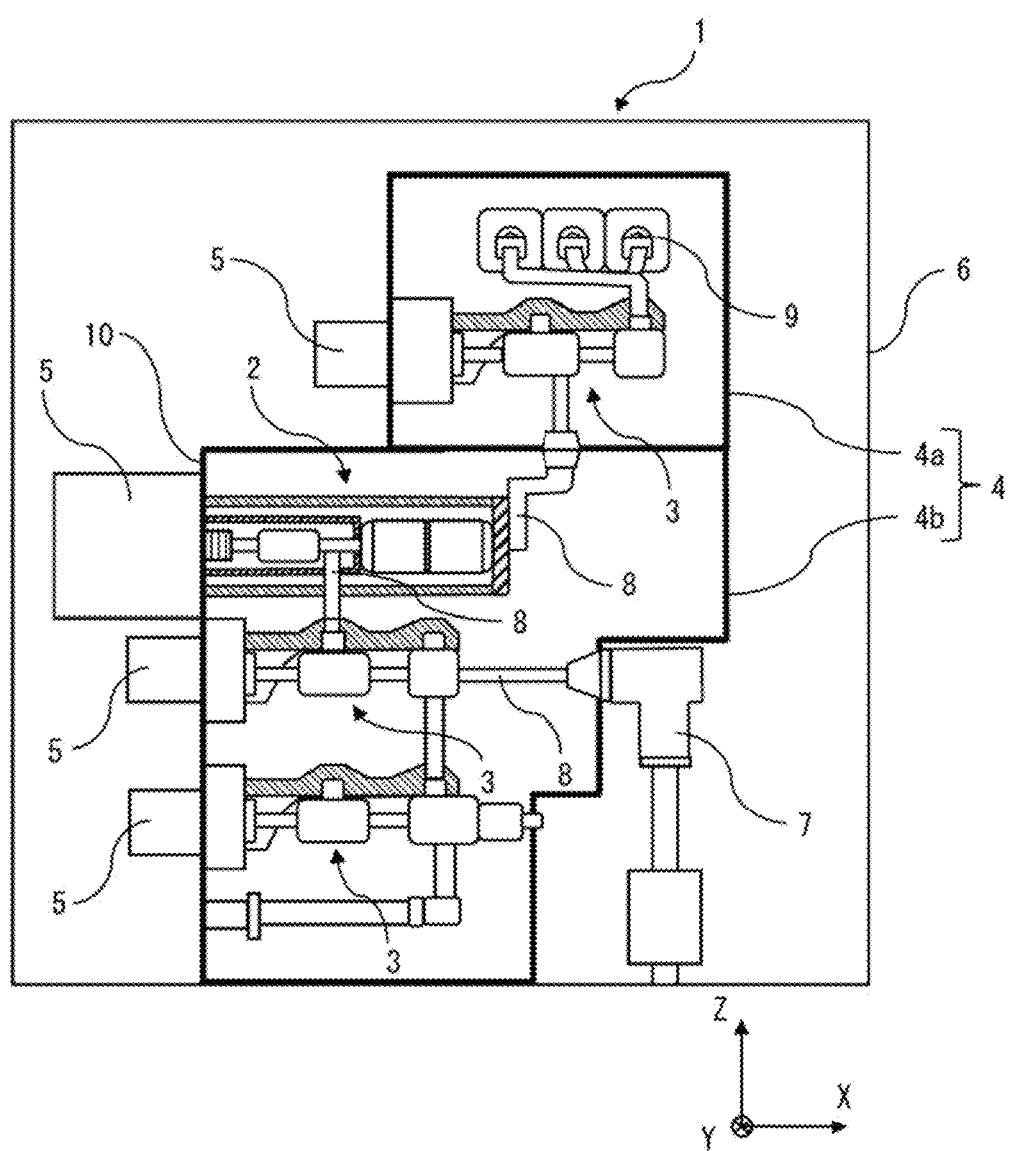
FIG. 1 is a cross-sectional view schematically showing the entirety of a gas-insulated switching device according to embodiment 1.

Hereinafter, gas-insulated switching devices according to embodiments will be described with reference to the drawings. In the description, identical or corresponding members and portions in the drawings are denoted by the same reference characters.

Embodiment 1

Figure 2:
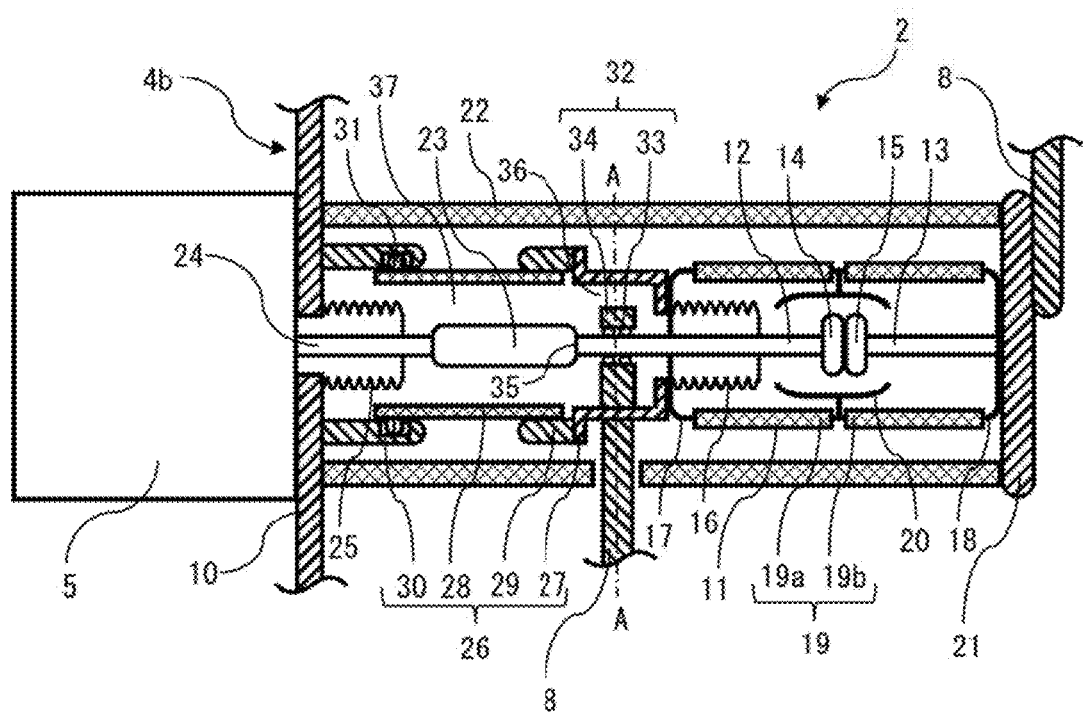
FIG. 2 is a partially enlarged cross-sectional view of the gas-insulated switching device according to embodiment 1.
Figure 3:
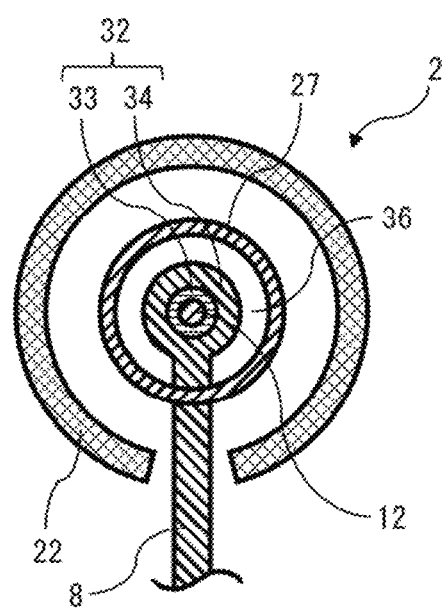
FIG. 3 is another partially enlarged cross-sectional view of the gas-insulated switching device according to embodiment 1.

Firstly, a schematic configuration of a gas-insulated switching device 1 according to embodiment 1 will be described. FIG. 1 is a cross-sectional view schematically showing the entirety of the gas-insulated switching device 1. FIG. 2 is a cross-sectional view in which a vacuum circuit breaker 2 which is a part of FIG. 1 is shown in an enlarged manner. FIG. 3 is a cross-sectional view taken along the alternate long and short dash line A-A in FIG. 2. In FIG. 1, regarding the vacuum circuit breaker 2, only a schematic configuration thereof is shown in a simplified manner.

As shown in FIG. 1, in the gas-insulated switching device 1, a pressure tank 4 is provided inside a cubicle 6 which is a housing made of metal. In the internal space of the pressure tank 4, insulative gas that is low in global warming potential such as dry air, $CO_2$, or $N_2$ is sealed at a high pressure (hereinafter, referred to as "tank internal pressure") that is, for example, about 0.5 MPa to 0.7 MPa in absolute pressure. The gas-insulated switching device 1 has a structure in which current introduced through a cable 7 is led via the vacuum circuit breaker 2 to buses 9 connected to an upper part of the inside of a pressure tank 4a. Inside pressure tanks 4a and 4b, the vacuum circuit breaker 2 and a disconnector 3 are connected via a main circuit conductor 8. For opening/closing the vacuum circuit breaker 2 and the disconnector 3, operation devices 5 provided outside the pressure tank 4 with a tank wall 10 therebetween are used. In the case where an electrical fault such as ground fault or short-circuiting has occurred in a normally flowing current or power grid, generated fault current is interrupted by opening a circuit by the vacuum circuit breaker 2, whereby the fault can be prevented from influencing connected peripheral devices.

As shown in FIG. 2, the vacuum circuit breaker 2 is composed of: a vacuum valve 11 having, in a vacuum, a movable contact 14 provided on one side of a movable conductor 12 and a fixed contact 15 provided to a fixed conductor 13; an insulation rod 23 connected to another side of the movable conductor 12 led out from the vacuum valve 11 through a bellows 16; an operation rod 24 connecting the insulation rod 23 and an operation device 5, which is provided outside the pressure tank 4, to each other; a sliding contact member 32 provided to the other side of the movable conductor 12; an airtight container 26; and the operation device 5 for opening/closing the vacuum valve 11.

In the vacuum valve 11 for opening/closing the circuit, the movable contact 14 and the fixed contact 15 are provided so as to be contactable with and separable from each other inside a cylindrical insulation cylinder 19 made of an insulating material such as ceramic. The insulation cylinder 19 is formed by a movable-side insulation cylinder 19a and a fixed-side insulation cylinder 19b connected to each other via an arc shield 20. As end surfaces of the insulation cylinder 19, a fixed-side end plate 18 and a movable-side end plate 17 are used to achieve airtightness. The arc shield 20 inhibits a material melted by an arc from adhering to the insulation cylinder 19 at the time of circuit breaking, thereby preventing deterioration of the insulation performance of the insulation cylinder 19. The bellows 16 is provided to the movable-side end plate 17 and connected to the movable conductor 12 so as to maintain the airtightness. Another side of the fixed conductor 13 is joined to the fixed-side end plate 18. The vacuum valve 11 is airtightly sealed by the movable-side end plate 17, the fixed-side end plate 18, the insulation cylinder 19, and the bellows 16. Although the movable-side insulation cylinder 19a and the fixed-side insulation cylinder 19b which are separate members are connected to each other to form the insulation cylinder 19 here, the insulation cylinder 19 may be formed by a single member with the arc shield being provided therein.

The fixed-side insulation cylinder 19b side of the vacuum valve 11 is fixed to the tank wall 10 via a fixed metal member 21 and an insulation support body 22 while maintaining insulation from the pressure tank 4b. The fixed metal member 21 is connected to the main circuit conductor 8. The movable-side insulation cylinder 19a side of the vacuum valve 11 is fixed to the tank wall 10 via the airtight container 26. The airtight container 26 insulates the vacuum valve 11 and the tank wall 10 from each other. The insulation support body 22 is, for example, a resin molded product made of an insulative material and is not required to have airtightness. Therefore, for the insulation support body 22, only a strength for retaining the vacuum valve 11 needs to be considered. Although a structure in which the insulation support body 22 is attached to the tank wall 10 is described in the present embodiment, the vacuum valve 11 may be attached with use of another structure such as a compact support body made of an insulating material and provided separately in the pressure tank 4b.

Next, the configuration of the airtight container 26 will be described focusing on explanations of the sliding contact member 32 which is a member that is characteristic of the present disclosure. In the airtight container 26, the sliding contact member 32, the movable conductor 12, the insulation rod 23, and the operation rod 24 are accommodated.

The sliding contact member 32 is composed of a sliding contactor 33 and a conduction member 34. As shown in FIG. 3, for example, a part of the conduction member 34 made of metal is in contact with and held by a movable-side metal container 27 composing the airtight container 26. A portion that does not hold the conduction member 34 is a gap 36 as a communication portion which allows communication inside the airtight container 26. The gap 36 is provided between the airtight container 26 and the sliding contact member 32. As shown in FIG. 2, the gap 36 allows communication between the vacuum valve 11 side and the tank wall 10 side across the conduction member 34. The sliding contactor 33 is implemented by, for example, a slide contact so as to allow energization even when the movable conductor 12 is driven by an opening/closing operation of the vacuum valve 11. The movable conductor 12 is connected, by the conduction member 34 connected thereto via the sliding contactor 33, via the airtight container 26 to a main circuit conductor 8 provided inside the pressure tank 4b. Since the movable conductor 12 and the movable-side metal container 27 are connected with use of the sliding contactor 33 and the conduction member 34, the sliding contact member 32 has no stretchable portion unlike a flexible conductor, and electrical and mechanical degradation is inhibited, whereby the reliability of the gas-insulated switching device 1 is maintained on a long-term basis. In addition, owing to the structure in which the movable conductor 12 slides in the sliding contact member 32 having the sliding contactor 33 fixed thereto, the airtight container 26 can be formed so as to have a small size. In order for the conduction member 34 and the main circuit conductor 8 to be connected to each other while maintaining an intermediate pressure inside the airtight container 26 described later, for example, the main circuit conductor 8 may be drawn into the movable-side metal container 27 with a current introduction terminal being provided to the movable-side metal container 27.

As shown in FIG. 2, one side of the insulation rod 23 is connected to the movable conductor 12 led out through the bellows 16, and another side of the insulation rod 23 is connected to the operation rod 24. The insulation distance between the movable conductor 12 and the operation rod 24 is ensured by the interposition of the insulation rod 23.

The operation rod 24 is connected via a tank bellows 25 to the operation device 5 provided outside the pressure tank 4b. The operation device 5 drives the movable conductor 12 via the operation rod 24 and the insulation rod 23 so as to perform opening/closing to cause the movable contact 14 to come into contact with or be separated from the fixed contact 15. At this time, the bellows 16 follows the movement of the movable conductor 12, whereby the inside of the vacuum valve 11 is kept vacuum. In addition, the tank bellows 25 follows the movement of the operation rod 24, whereby the inside of the airtight container 26 is kept airtight.

The airtight container 26 is formed by connecting the movable-side metal container 27, a high-pressure-side electric field relaxing shield 29, an intermediate pressure chamber insulation cylinder 28, and a low-pressure-side electric field relaxing shield 30 to each other. These members are connected to each other via airtight seal members such as O rings so as to make the inside of the airtight container 26 airtight. The insulation rod 23, the operation rod 24, the movable conductor 12 led out through the bellows 16, and the sliding contact member 32 provided on the other side of the movable conductor 12 are accommodated inside the airtight container 26. The internal space of the bellows 16 and the internal space of the airtight container 26 are in communication with each other to form an intermediate pressure chamber 37. The intermediate pressure chamber 37 is formed as a compartment of which the internal pressure (hereinafter, referred to as "intermediate pressure") is an intermediate pressure higher than the atmospheric pressure and lower than the tank internal pressure. The intermediate pressure chamber 37 is filled with insulative gas that is low in global warming potential, such as dry air, $CO_2$, or $N_2$. Insulation performance inside the intermediate pressure chamber 37 can be improved as compared to the case where the internal pressure of the intermediate pressure chamber 37 is the atmospheric pressure. In addition, if any of these insulative gases is used, the insulative gas can be easily handled. The intermediate pressure chamber insulation cylinder 28 is implemented by an insulator made of, for example, a thermoplastic resin in order to insulate the vacuum valve 11 and the pressure tank 4b from each other.

The airtight container 26 is designed so as to have such a strength as to be able to endure the differential pressure between the intermediate pressure and the tank internal pressure.

The high-pressure-side electric field relaxing shield 29 and the low-pressure-side electric field relaxing shield 30 are provided such that a portion near a connection portion 35 between the insulation rod 23 and the movable conductor 12 is enclosed particularly by the high-pressure-side electric field relaxing shield 29, in order to relax an electric field around the insulation rod 23 under the intermediate pressure lower than the tank internal pressure. The high-pressure-side electric field relaxing shield 29 and the low-pressure-side electric field relaxing shield 30 are made of a metal such as SUS, iron, copper, brass, or aluminum, for example. The high-pressure-side electric field relaxing shield 29 and the low-pressure-side electric field relaxing shield 30 are arranged on the outer side of the intermediate pressure chamber insulation cylinder 28. The outer side is insulated by the insulative gas at the tank internal pressure. Thus, an electric field can be designed to be higher than in the case where the high-pressure-side electric field relaxing shield 29 and the low-pressure-side electric field relaxing shield 30 are arranged on the inner side of the airtight container 26. Therefore, if the high-pressure-side electric field relaxing shield 29 and the low-pressure-side electric field relaxing shield 30 are arranged on the outer side, the outer dimensions of the high-pressure-side electric field relaxing shield 29 and the low-pressure-side electric field relaxing shield 30 can be made small.

The intermediate pressure chamber insulation cylinder 28 and the low-pressure-side electric field relaxing shield 30 are cylindrical members having different diameters and are engaged with each other so as to be slidable parallel to the movable direction of the movable conductor 12 in a state of maintaining airtightness via an elastic airtight seal member 31. The airtight seal member 31 is fitted into a groove formed in the inner wall surface of the low-pressure-side electric field relaxing shield 30. The airtight seal member 31 is made of elastomer which is lower in cost than an airtight seal member made of metal. Although the airtight seal member 31 is implemented by an O ring that can easily ensure airtightness by being fitted into the groove in the present embodiment, the airtight seal member 31 is not limited thereto. The slidable engagement allows mitigation of stress that is applied to the airtight container 26 owing to: displacement of the vacuum valve 11 caused by expansion or contraction due to heat of the insulation support body 22; or impulsive vibrations due to a contact opening/closing operation. The relaxation of the stress allows inhibition of gas leakage due to a fracture of the airtight container 26, thereby maintaining a predetermined intermediate pressure for a long period. Accordingly, the reliability of the compartment having the intermediate pressure can be improved. In the present embodiment, the slidable engagement is made at a portion at which the intermediate pressure chamber insulation cylinder 28 and the low-pressure-side electric field relaxing shield 30 are connected to each other. However, the present disclosure is not limited thereto, and the slidable engagement may be made at a portion at which other members are connected to each other or at a plurality of portions.

The internal space of the intermediate pressure chamber 37 when an opening/closing operation of the vacuum valve 11 is performed in the above-described airtight container 26 provided with the sliding contact member 32 which is characteristic of the present disclosure, will be described. As shown in FIG. 2, the gap 36 allows communication between the vacuum valve 11 side and the tank wall 10 side across the conduction member 34. FIG. 2 illustrates a state where the vacuum valve 11 is closed. When the vacuum valve 11 is opened, the movable conductor 12 is driven toward the tank wall 10. Accordingly, the bellows 16 and the tank bellows 25 contract in association with the drive. At this time, insulation gas that is present in the internal space of the bellows 16 is squeezed out to the airtight container 26 side according to the extent to which the bellows 16 has contracted. Meanwhile, the tank bellows 25 also contracts so that the volume of the tank wall 10 side relative to the conduction member 34 increases. Accordingly, the insulation gas having been squeezed out is moved toward the internal space on the tank wall 10 side of the airtight container 26. Contrariwise, when the vacuum valve 11 is closed, insulation gas in the internal space of the airtight container 26 flows toward the internal space of the bellows 16 located on the vacuum valve 11 side relative to the conduction member 34. In this manner, since the gap 36 is provided together with the sliding contact member 32, the insulation gas in the intermediate pressure chamber 37 smoothly flows so that change in the intermediate pressure is suppressed. Accordingly, the insulation gas can be inhibited from serving as a hindrance to an opening/closing operation, whereby the opening/closing operation can be smoothly performed without influencing the speed of opening/closing. In addition, if the bellows 16 and the tank bellows 25 have the same outer diameter, the volume of the intermediate pressure chamber 37 is unchanged and the pressure is maintained to be unchanged, regardless of the opening/closing operation. Therefore, the opening/closing operation can be more smoothly performed.

As described above, in the gas-insulated switching device 1, the conduction member 34 is provided so as to be in contact with the airtight container 26, and thus frictional force generated by sliding between the movable conductor 12 and the sliding contactor 33 can be retained at a portion at which the conduction member 34 and the airtight container 26 are in contact with each other, whereby the mechanical reliability of the gas-insulated switching device 1 can be ensured. In addition, since the conduction member 34 is provided so as to be in contact with the airtight container 26 without being provided with any stretchable portion unlike a flexible conductor, the electrical and mechanical reliability of the gas-insulated switching device 1 can be ensured. In addition, since connection is made to the main circuit conductor 8 provided inside the pressure tank 4b without providing any stretchable portion to the sliding contact member 32, the airtight container 26 provided as a compartment having an intermediate pressure can be downsized. In addition, since the gap 36 as a communication portion is provided between the sliding contact member 32 and the airtight container 26, change in the intermediate pressure is suppressed, whereby an opening/closing operation of the vacuum valve 11 can be smoothly performed.

Although the airtight seal member 31 is provided in the groove formed in the inner wall surface of the low-pressure-side electric field relaxing shield 30, the present disclosure is not limited thereto, and the airtight seal member 31 may be provided in a groove formed in the outer wall surface of the intermediate pressure chamber insulation cylinder 28.

Embodiment 2

Figure 4:
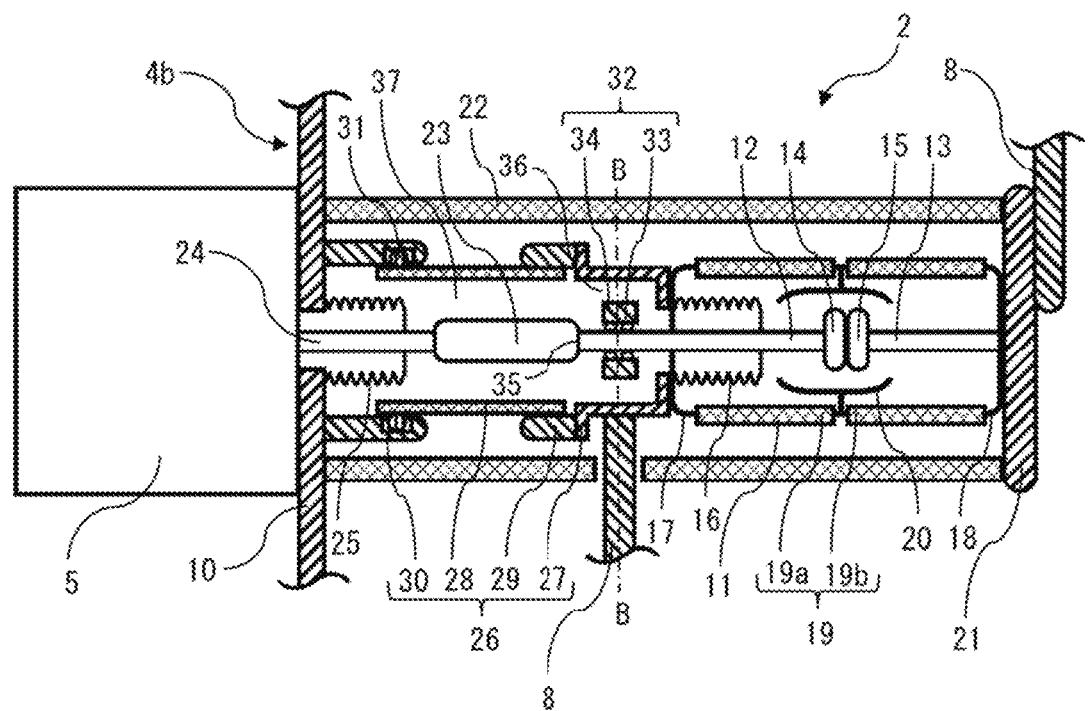
FIG. 4 is a partially enlarged cross-sectional view of a gas-insulated switching device according to embodiment 2.
Figure 5:
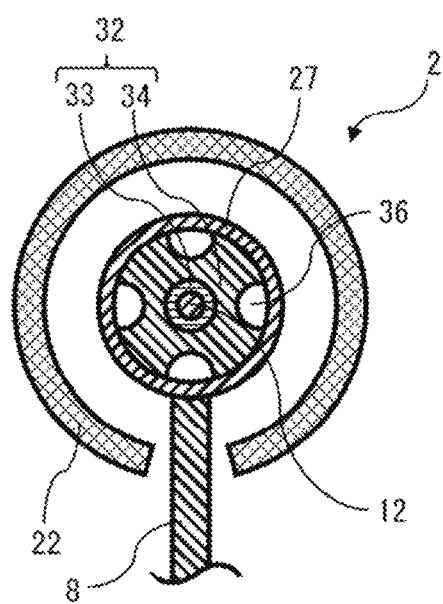
FIG. 5 is another partially enlarged cross-sectional view of the gas-insulated switching device according to embodiment 2.

A configuration of a gas-insulated switching device 1 according to embodiment 2 will be described. FIG. 4 is a cross-sectional view in which a vacuum circuit breaker 2 which is a part of the gas-insulated switching device 1 is shown in an enlarged manner. FIG. 5 is a cross-sectional view taken along the alternate long and short dash line B-B in FIG. 4. In embodiment 1, the conduction member 34 is, at one location thereon, partially in contact with and held by the movable-side metal container 27. Meanwhile, in embodiment 2, a conduction member 34 is, at four locations thereon, in contact with and held by the movable-side metal container 27, and gaps 36 as communication portions are provided at four locations. The other components are the same as those described in embodiment 1 and thus denoted by the same reference characters, and description thereof is omitted.

The sliding contact member 32 is composed of the sliding contactor 33 and the conduction member 34. As shown in FIG. 5, for example, the conduction member 34 made of metal is, at four locations thereon, in contact with and held by the movable-side metal container 27 composing the airtight container 26. Portions at which the conduction member 34 is not held are the gaps 36 at four locations which allow communication inside the airtight container 26. As shown in FIG. 4, the gaps 36 allow communication between the vacuum valve 11 side and the tank wall 10 side across the conduction member 34. Since the gaps 36 are provided, insulation gas in the intermediate pressure chamber 37 smoothly flows through these gaps 36. Accordingly, the insulation gas can be inhibited from serving as a hindrance to an opening/closing operation, whereby the opening/closing operation can be smoothly performed.

As described above, the conduction member 34 is provided so as to be, at four locations thereon, in contact with the airtight container 26. Thus, frictional force generated by sliding between the movable conductor 12 and the sliding contactor 33 can be retained at the four locations on the conduction member 34, whereby the mechanical reliability of the gas-insulated switching device 1 can be further ensured. In addition, since the conduction member 34 is, at four locations thereon, provided with the gaps 36 which allow communication inside the airtight container 26, change in the intermediate pressure is suppressed, whereby an opening/closing operation of the vacuum valve 11 can be smoothly performed.

Although the gaps 36 are provided at four locations here, the number of gaps 36 is not limited thereto, and the number only has to be such that: the vacuum valve 11 side and the tank wall 10 side are allowed to be in communication with each other without causing any pressure loss; and the conduction member 34 is stably held by the movable-side metal container 27.

Embodiment 3

Figure 6:
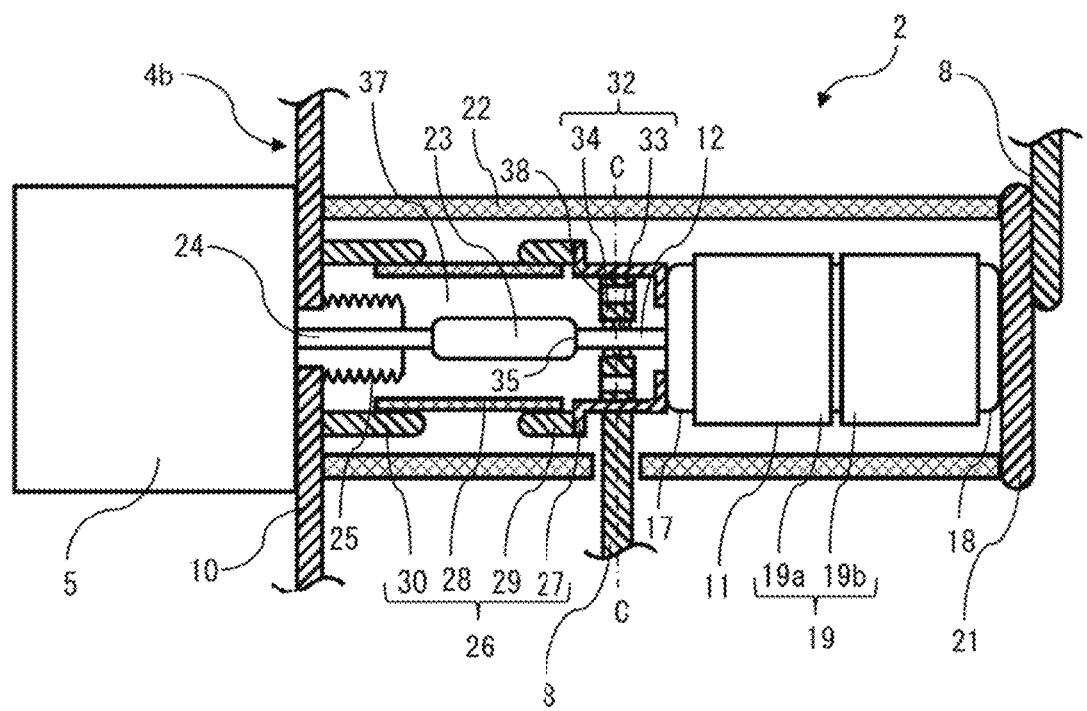
FIG. 6 is a partially enlarged cross-sectional view of a gas-insulated switching device according to embodiment 3.
Figure 7:
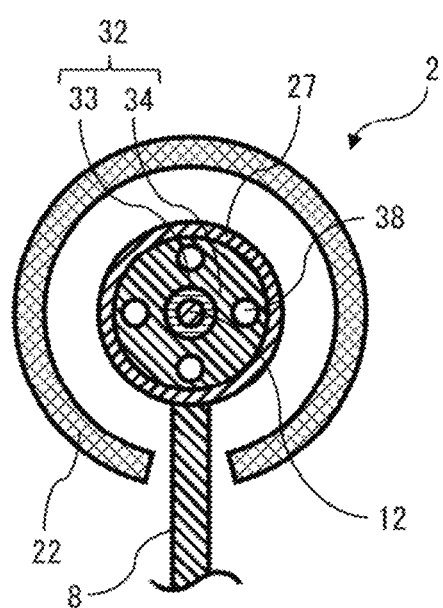
FIG. 7 is another partially enlarged cross-sectional view of the gas-insulated switching device according to embodiment 3.

A configuration of a gas-insulated switching device 1 according to embodiment 3 will be described. FIG. 6 is a cross-sectional view in which a vacuum circuit breaker 2 which is a part of the gas-insulated switching device 1 is shown in an enlarged manner. FIG. 7 is a cross-sectional view taken along the alternate long and short dash line C-C in FIG. 6. In FIG. 6, regarding the vacuum valve 11, only the outer appearance thereof is shown in a simplified manner. In embodiment 1, the gap 36 is provided between the sliding contact member 32 and the airtight container 26. Meanwhile, in embodiment 3, a sliding contact member 32 is, at the entire circumference thereof, in contact with the airtight container 26, and the sliding contact member 32 is provided with through holes 38 as communication portions which allow communication, across the sliding contact member 32, inside the airtight container 26. The other components are the same as those described in embodiment 1 and thus denoted by the same reference characters, and description thereof is omitted.

As shown in FIG. 6, the sliding contact member 32 is composed of the sliding contactor 33 and a conduction member 34, and connects the movable conductor 12 and the main circuit conductor 8 to each other. The conduction member 34 is provided so as to be in contact with the movable-side metal container 27, and the main circuit conductor 8 and the conduction member 34 are connected to each other via the movable-side metal container 27. The through holes 38 are formed in the conduction member 34, and the through holes 38 allow communication between the vacuum valve 11 side and the tank wall 10 side across the conduction member 34. As shown in FIG. 7, the conduction member 34 is provided with the plurality of through holes 38, and thus insulation gas in the intermediate pressure chamber 37 smoothly flows through these through holes 38. Accordingly, the insulation gas can be inhibited from serving as a hindrance to an opening/closing operation, whereby the opening/closing operation can be smoothly performed.

As described above, the conduction member 34 is provided so as to be in contact with the airtight container 26. Thus, frictional force generated by sliding between the movable conductor 12 and the sliding contactor 33 can be retained by the entire circumference of the conduction member 34, whereby the mechanical reliability of the gas-insulated switching device 1 can be further ensured. In addition, since the conduction member 34 is provided with the through holes 38 which allow communication inside the airtight container 26, change in the intermediate pressure is suppressed, whereby an opening/closing operation of the vacuum valve 11 can be smoothly performed.

Although four through holes 38 are provided here, the number of through holes 38 and the areas thereof are not limited, and the number and the areas only have to be such that the vacuum valve 11 side and the tank wall 10 side are allowed to be in communication with each other without causing any pressure loss.

Embodiment 4

Figure 8:
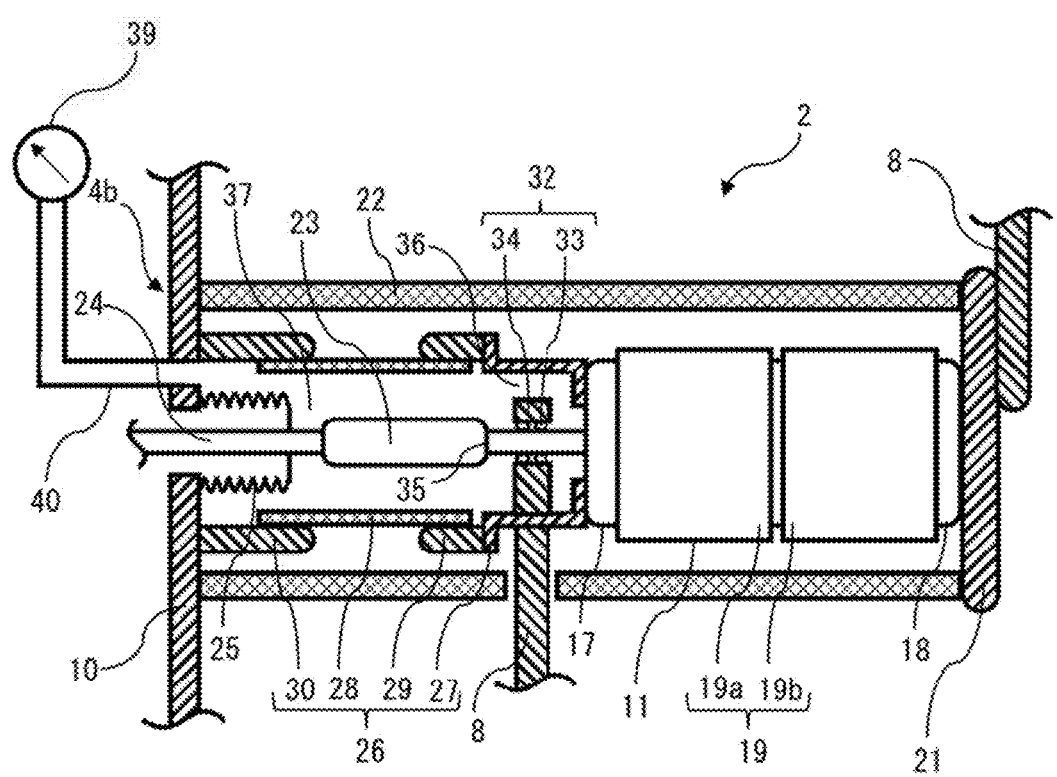
FIG. 8 is a partially enlarged cross-sectional view of a gas-insulated switching device according to embodiment 4.

A configuration of a gas-insulated switching device 1 according to embodiment 4 will be described. FIG. 8 is a cross-sectional view in which a vacuum circuit breaker 2 which is a part of the gas-insulated switching device 1 is shown in an enlarged manner. In FIG. 8, regarding the vacuum valve 11, only the outer appearance thereof is shown in a simplified manner, and the operation device 5 is not shown. Although no pressure gauge 39 is provided in embodiment 1, a pressure gauge 39 for measuring the intermediate pressure is provided in embodiment 4. The other components are the same as those described in embodiment 1 and thus denoted by the same reference characters, and description thereof is omitted.

The pressure gauge 39 is provided to a pipe 40 led out from the airtight container 26 so as to penetrate the tank wall 10. The intermediate pressure in the intermediate pressure chamber 37 is measured by the pressure gauge 39. An operation of the vacuum circuit breaker 2 is desirably as follows. The gap 36 is provided together with the sliding contact member 32 so that change in the intermediate pressure is constantly suppressed, whereby an opening/closing operation of the vacuum valve 11 is smoothly performed. The pressure gauge 39 monitors the change in the intermediate pressure, and is for verifying a smooth opening/closing operation and ensuring the reliability of the gas-insulated switching device 1. A measured pressure value may be checked on the provided pressure gauge 39, or a communication function may be imparted to the pressure gauge 39 so that the measured pressure value is checked on a device with which the pressure gauge 39 has communicated.

In monitoring of the intermediate pressure, the pressure gauge 39 may measure a significant change in the intermediate pressure. Firstly, the case of decrease in the intermediate pressure will be described. If the bellows 16 or the tank bellows 25 is fractured, the intermediate pressure decreases. The decrease in the intermediate pressure causes deterioration of the creepage insulation performance of each of the insulation rod 23 and the intermediate pressure chamber insulation cylinder 28. In addition, if the bellows 16 is fractured, the degree of vacuum in the vacuum valve 11 decreases, and thus current-interrupting performance deteriorates. Regarding deterioration of these performances, monitoring can be performed by measuring the intermediate pressure. In addition, which of the bellows 16 and the tank bellows 25 has been fractured can be estimated based on a value obtained when the intermediate pressure has stabilized after decreasing.

Next, the case of increase in the intermediate pressure being measured will be described. If any of the movable-side metal container 27, the high-pressure-side electric field relaxing shield 29, the intermediate pressure chamber insulation cylinder 28, and the low-pressure-side electric field relaxing shield 30 is fractured or an airtight seal member provided at a portion at which these members are connected to each other is fractured, the intermediate pressure increases. The increase in the intermediate pressure causes increase in the pressure to be applied to the bellows 16 and the tank bellows 25, whereby the probability of causing fractures to these bellows increases. Regarding the probability of the fractures, monitoring can be performed by measuring the intermediate pressure. A fracture of any of the members composing the airtight container 26 may be caused by an opening/closing operation of the vacuum valve 11 by which intense stress is applied to these members. Therefore, it is important to swiftly detect change in the intermediate pressure immediately after an opening/closing operation. Since the intermediate pressure chamber 37 in which communication is allowed by providing the gap 36 is formed here, the intermediate pressure quickly stabilizes after an opening/closing operation. Accordingly, the above-described fracture can be swiftly detected.

As described above, the pressure gauge 39 for measuring the intermediate pressure is provided, and thus whether an opening/closing operation of the vacuum valve 11 is being smoothly performed can be checked by monitoring the change in the intermediate pressure. In addition, by measuring decrease in the intermediate pressure, a fracture of the bellows 16 or the tank bellows 25 can be detected, whereby it is possible to determine that creepage insulation performance and current-interrupting performance have deteriorated. In addition, by measuring increase in the intermediate pressure, a fracture of any of the members composing the airtight container 26 can be detected, whereby it is possible to determine in advance the probability of fractures in the bellows 16 and the tank bellows 25 being present. In addition, with these determinations, the reliability of the gas-insulated switching device 1 can be ensured.

Embodiment 5

Figure 9:
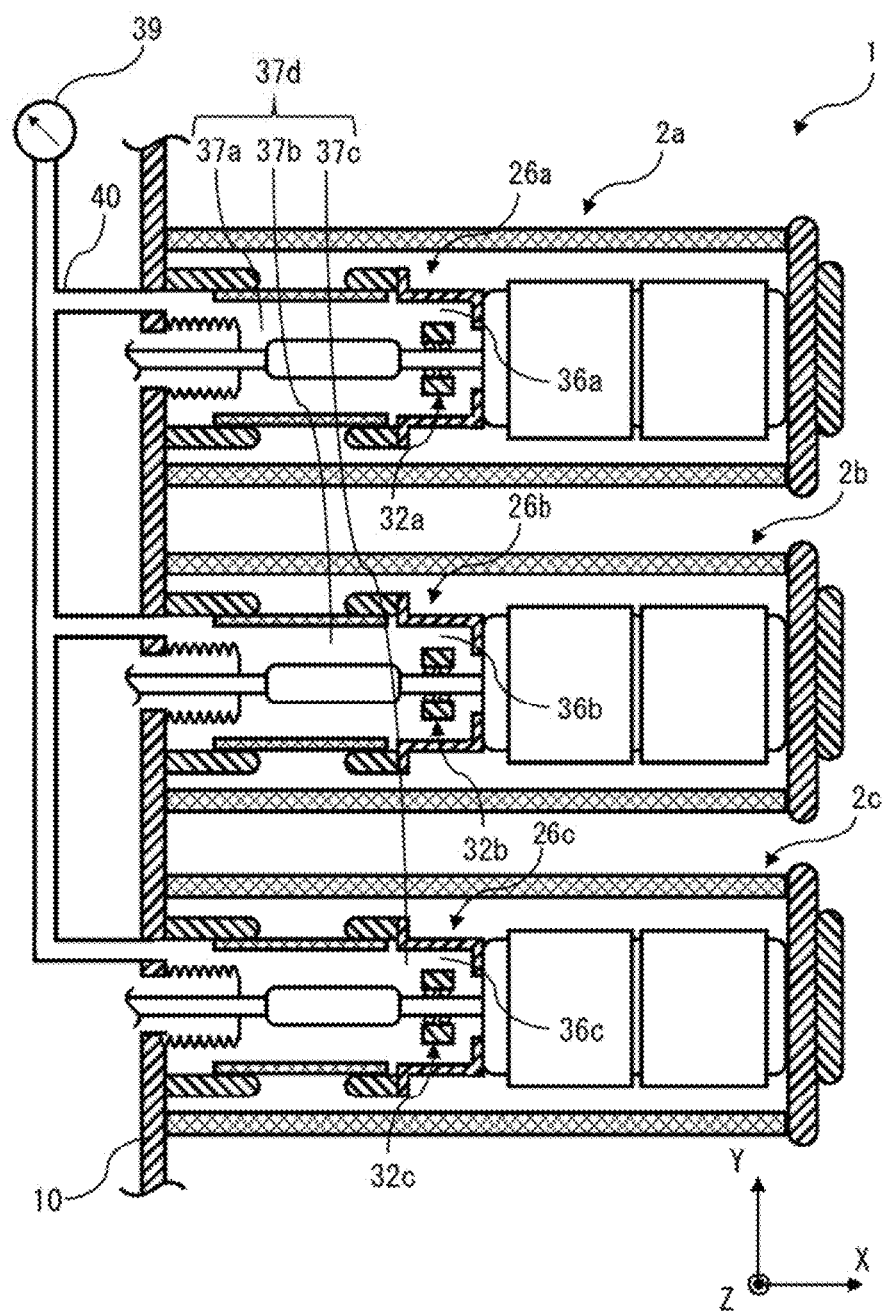
FIG. 9 is a partially enlarged cross-sectional view of a gas-insulated switching device according to embodiment 5.

A configuration of a gas-insulated switching device 1 according to embodiment 5 will be described. FIG. 9 is a cross-sectional view in which three vacuum circuit breakers 2 which are parts of the gas-insulated switching device 1 are shown in an enlarged manner. In FIG. 9, regarding vacuum valves 11, only the outer appearances thereof are shown in a simplified manner, and operation devices 5 are not shown. In embodiment 4, one intermediate pressure chamber 37 composed of the internal space of the bellows 16 and the internal space of the airtight container 26 in communication with each other is provided, and the pressure gauge 39 for measuring the intermediate pressure in the one intermediate pressure chamber 37 is provided. Meanwhile, in embodiment 5, a plurality of intermediate pressure chambers 37 are in communication with each other, and a pressure gauge 39 for measuring intermediate pressures in the intermediate pressure chambers 37 in communication with each other is provided. The other components are the same as those described in embodiment 1 and thus denoted by the same reference characters, and description thereof is omitted.

As shown in FIG. 9, three vacuum circuit breakers 2a, 2b, and 2c are provided in one gas-insulated switching device 1 in parallel to each other in a Y direction, and pipes 40 led out from airtight containers 26a, 26b, and 26c of the vacuum circuit breakers 2a, 2b, and 2c so as to penetrate the tank wall 10 are connected to each other. Since gaps 36a, 36b, and 36c are provided together with sliding contact members 32a, 32b, and 32c, communication is allowed inside intermediate pressure chambers 37a, 37b, and 37c. The intermediate pressure chambers 37a, 37b, and 37c are in communication with each other through the pipes 40 to form an intermediate pressure chamber 37d, and the pressure gauge 39 is provided to the pipes 40. The intermediate pressure in the intermediate pressure chamber 37d is measured by the one pressure gauge 39.

As described above, the plurality of intermediate pressure chambers 37a, 37b, and 37c are in communication with each other, and thus the intermediate pressures in the plurality of intermediate pressure chambers 37a, 37b, and 37c can be measured by the one pressure gauge 39. In addition, the intermediate pressures in the plurality of intermediate pressure chambers 37a, 37b, and 37c are treated as a common intermediate pressure, and thus, when the intermediate pressure increases or decreases, a sudden change in the pressure can be mitigated, and time margin for taking measures such as opening of each vacuum circuit breaker or the disconnector can be ensured. In addition, since a sudden change in the pressure can be mitigated, a time for taking measures against a fracture can be ensured.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 gas-insulated switching device
2 vacuum circuit breaker
3 disconnector
4 pressure tank
5 operation device
6 cubicle
7 cable
8 main circuit conductor
9 bus
10 tank wall
11 vacuum valve
12 movable conductor
13 fixed conductor
14 movable contact
15 fixed contact
16 bellows
17 movable-side end plate
18 fixed-side end plate
19 insulation cylinder
19a movable-side insulation cylinder
19b fixed-side insulation cylinder
20 arc shield
21 fixed metal member
22 insulation support body
23 insulation rod
24 operation rod
25 tank bellows
26 airtight container
27 movable-side metal container
28 intermediate pressure chamber insulation cylinder
29 high-pressure-side electric field relaxing shield
30 low-pressure-side electric field relaxing shield
31 airtight seal member
32 sliding contact member
33 sliding contactor
34 conduction member
35 connection portion
36 gap
37 intermediate pressure chamber
38 through hole
39 pressure gauge
40 pipe

The invention claimed is:

1. A gas-insulated switching device comprising, inside a pressure tank:
   a vacuum valve having, in a vacuum, a movable contact provided on one side of a movable conductor and a fixed contact provided to a fixed conductor;
   an insulation rod connected to another side of the movable conductor led out from the vacuum valve through a bellows;
   an operation rod connecting the insulation rod and an operation device for the vacuum valve to each other, the operation device being provided outside the pressure tank, the operation rod being connected via a tank bellows on the operation device side;
   an airtight container in which the insulation rod, the other side of the movable conductor, the operation rod, and the tank bellows are accommodated; and
   an intermediate pressure chamber formed by communication between an internal space of the bellows and an internal space of the airtight container, wherein
   a sliding contact member is provided on the other side of the movable conductor,
   the sliding contact member is connected, via the airtight container, to a main circuit conductor provided inside the pressure tank,
   a communication portion which allows fluid communication, across the sliding contact member between the vacuum valve and the operation device side of the airtight container, inside the airtight container is provided between the airtight container and the sliding contact member, and the bellows and the tank bellows have a same outer diameter.

2. The gas-insulated switching device according to claim 1, wherein the communication portion is a gap provided between the airtight container and the sliding contact member.

3. The gas-insulated switching device according to claim 1, wherein the communication portion is a through hole provided in the sliding contact member.

4. The gas-insulated switching device according to claim 1, wherein a plurality of the vacuum valves and a plurality of the airtight containers are provided inside the pressure tank, to form a plurality of intermediate pressure chambers, and the plurality of intermediate pressure chambers are in communication with each other.

5. The gas-insulated switching device according to claim 1, further comprising a pressure gauge for measuring a pressure in the intermediate pressure chamber.

6. The gas-insulated switching device according to claim 1, wherein the intermediate pressure chamber is filled with a gas at a pressure that is lower than an internal pressure of the pressure tank and higher than atmospheric pressure.

* * * * *